(12) United States Patent
Kawasaki (10) Patent No.: US 8,591,218 B2
(45) Date of Patent: Nov. 26, 2013

(54) INJECTION DEVICE IN A MOLDING MACHINE

(75) Inventor: Hiroaki Kawasaki, Chiba-ken (JP)

(73) Assignee: Century Innovation Corporation, Chosei-Gun, Chiba-Ken (JP)

( * ) Notice: Subject to any disclaimer, the term of this patent is extended or adjusted under 35 U.S.C. 154(b) by 33 days.

(21) Appl. No.: 13/452,804

(22) Filed: Apr. 20, 2012

(65) Prior Publication Data

US 2013/0071510 A1 Mar. 21, 2013

(30) Foreign Application Priority Data

Sep. 21, 2011 (JP) ................................. 2011-206361

(51) Int. Cl.
 *B29C 45/74* (2006.01)
(52) U.S. Cl.
 USPC ....... 425/542; 264/328.14; 425/547; 425/548
(58) Field of Classification Search
 USPC ......... 425/542, 547, 548; 264/328.14, 328.15
 See application file for complete search history.

(56) References Cited

U.S. PATENT DOCUMENTS 2,203,620 A * 6/1940 Smith ........................... 425/547
2,779,972 A * 2/1957 Kins ............................. 425/547

FOREIGN PATENT DOCUMENTS

JP S36-9884 A 7/1961
JP H6-246802 A 9/1994

* cited by examiner

*Primary Examiner* — Tim Heitbrink
(74) *Attorney, Agent, or Firm* — McGinn IP Law Group, PLLC (57) ABSTRACT

A injection device in molding machine is capable of efficiently heating and melting a plurality of charged pellets in a short period of time, and injecting a melting resin with superior quality.
The injection device has a cylinder including a pellet supply port, a plunger, a driving unit, a melting instrument with a plurality of melting holes, which are cone-shaped passages, formed in a cylinder-shaped instrument body to communicate from inflow-side large openings to outflow-side small openings, a nozzle provided on an injection side of the cylinder and a heating unit heating the melting instrument. A diameter of the tip-end of the plunger is set to be the same as a diameter of the outflow side face of the melting machine.

11 Claims, 9 Drawing Sheets

VIEW TAKEN ALONG LINE X2-X2

Fig.2C

EXPANDED VIEW OF (II) PORTION

INFLOW-SIDE

OUTFLOW-SIDE

Fig.7C

EXPANDED VIEW TAKEN ALONG LINE X8-X8

Fig.7D

EXPANDED VIEW TAKEN ALONG LINE X9-X9

Fig.7E

EXPANDED VIEW TAKEN ALONG LINE X10-X10

PRESENT INVENTION

Fig.9b

CONVENTIONAL ART

INJECTION DEVICE IN A MOLDING MACHINE

BACKGROUND OF THE INVENTION

1. Field of the Invention

The present invention relates to an injection device in a molding machine capable of efficiently heating and melting a plurality of charged pellets in a short period of time, and injecting a melting resin with superior quality.

2. Description of the Related Art

Generally, there are screw-type and plunger-type injection devices. Japanese Patent Application Laid-Open No. H6-246802 discloses a screw-type injection device typically, which is mainly constituted of a cylinder and a screw. Pellets charged from a hopper provided in the cylinder are transferred to an injection nozzle side by rotation of the screw inside of the cylinder, and are heated and melted in a transfer process. Then, the melted resin is collected to a tip-end of the nozzle, which is then injected, and the melted resin thus obtained is sent to a molding die.

A general pellet is made of resin (plastic), and a thermal conductivity thereof is about 0.07 to 0.20 kcal/m·hr·° C., which is one hundredth to one several thousandths of the thermal conductivity of metal. Therefore, it can be said that the pellet is substantially a heat insulating material. Accordingly, even if sufficient heat of fusion is imparted to the pellet for melting the pellet, heat is hardly transmitted to inside of the pellet (center portion), and much time is required for sufficiently heating the pellet.

Accordingly, it takes a long time to sufficiently melt the individual pellet in a state possible to carry out resin molding. Namely, it takes relatively a long time to melt the pellet in the cylinder, thus making work efficiency unsatisfactory. Further, in the injection device, solid matters of a plurality of pellets charged into the cylinder are heated and moved to an injection side by rotation of the screw, and at this time, a part of the plurality of pellets is set in a pressed state onto an inner wall of the cylinder.

Specifically, the pellets are partially pressed onto the inner wall of the cylinder. At this time, only a part of a surface of the solid matter of the pressed individual pellet, is brought into contact with the inner wall of the cylinder. Therefore, in the melting of the individual pellet, pellet solid matters are simply partially melted. The pellet kneaded by the screw in the cylinder is separated from the inner wall of the cylinder, thus not sufficiently heating the separated pellet. Therefore, the whole body of the solid matters of the pellets is not melted, and most of the pellets are in a state of a mixture of a melting portion and a non-melting portion.

Even in a case that the pellet is repeatedly pressed onto the inner wall of the cylinder by the screw, to thereby melt the pellet completely, and the melted pellet is transferred in the vicinity of the nozzle, an amount of the resin that stays in the cylinder is dozens of times or more of an amount required for one injection, and an excessive amount of pellet stays in the cylinder.

Further, when the melted resin passes a space between the screw and the cylinder, mechanical damage is imparted to the resin. Particularly, in a case of melting the pellet including glass fibers, lots of problems are involved, thus wearing the screw. Moreover, only a part of the pellet is melted at random, and therefore it is unavoidable that the same pellet always remains in the cylinder. Therefore, a work of exchanging materials of the pellet in the cylinder is laborious.

There is also a plunger-type in addition to the aforementioned screw-type. Such a plunger-type has a simple structure, and can be easily miniaturized. Further, the plunger-type has no defect such as wearing the screw. Japanese Examined Patent Publication No. S36-9884 discloses the plunger-type with a most basic structure, which is mainly constituted of a frustum-shaped heating cylinder having a plurality of through-holes; an injection plunger; and a supply cylinder, etc. Wherein, a synthetic resin raw material is sent to the heating cylinder by the injection plunger, thus carrying out injection. However, Japanese Examined Patent Publication No. S36-9884 also has various problems.

First, in Japanese Examined Patent Publication No. S36-9884, the injection plunger and the frustum-shaped heating cylinder are faced with each other and mutually have different diameters, and therefore the diameter of the injection plunger is formed to be slightly smaller than the diameter of an opposed part of the heating cylinder. Further, a space chamber with a wider capacity than an area of the tip-end of the injection plunger exists between the tip-end of the injection plunger and the heating cylinder, and the tip-end of the injection plunger and the supply cylinder.

Accordingly, although the melted synthetic resin raw material is extruded once into the space chamber by the injection plunger, the synthetic resin raw material cannot be efficiently flowed into the through-hole of the heating cylinder even if the injection plunger is further moved to the heating cylinder side, thus posing a problem that the synthetic resin raw material remains in the space chamber without flowing into the heating cylinder, and further posing a problem that the synthetic resin raw material remained in the space chamber becomes an obstacle to the synthetic resin raw material newly sent into the through-hole of the heating cylinder, and further posing a problem that the newly sent synthetic resin raw material and degraded resin due to long stay in the space chamber are mixed with each other.

Further, as described above, the tip-end side of the heating cylinder is formed into substantially the frustum-shape, and therefore a plurality of through-holes formed on the heating cylinder are converged toward an outflow-side from an inflow-side of the synthetic resin raw material, with an interval gradually narrowed. Namely, although the plurality of through-holes is arranged in such a manner as being properly dispersed with large intervals, outflow-side openings are crowded in a narrow range.

Therefore, the heating cylinder is formed so that intervals between through-holes are gradually narrower toward the outflow-side, thus making a cross-sectional area of a thick wall portion gradually smaller, which is the cross-sectional area of a thick wall portion excluding a formation part of each through-hole. Specifically, the heating cylinder of Japanese Examined Patent Publication No. S36-9884 is formed so that an overall heat capacity becomes smaller due to its frustum-shape, with a volume of the thick wall portion (solid portion) becoming smaller toward the outflow-side where particularly a plurality of through-holes are converged, and accordingly the heat capacity is also smaller toward the outflow-side (see FIG. 9B)

Further, according to Japanese Examined Patent Publication No. S36-9884, an inner diameter of the through-hole becomes smaller toward the outflow-side from the inflow-side, thus gradually increasing a moving speed of the synthetic resin raw material that flows and moves through the through-holes. Therefore, a heating section with small heat capacity cannot transmit a sufficient quantity of heat for heating and melting the resin, thus involving a problem that a temperature of the synthetic resin moving through the through-holes is decreased in a moving process. Therefore, in order to maintain a melting state of the synthetic resin raw material, a large heat quantity needs to be imparted to the heating cylinder, and therefore a heater band is mounted on an outer periphery of the heating cylinder.

However, as described above, the heating cylinder itself is formed into the frustum-shape, with small heat capacity and particularly with small heat capacity at the outflow-side of each through-hole, thus making it impossible to transmit a sufficient quantity of heat to the synthetic resin raw material that moves through the through-hole. Therefore, the temperature of the synthetic resin raw material is decreased, and the heat of the heating cylinder is removed, thus reducing the temperature.

SUMMARY OF THE INVENTION

Therefore, the temperature of the synthetic resin raw material flowing and moving through the through-hole is decreased in the moving process, and a uniform melting state is hardly maintained, thus injecting the synthetic resin raw material including a defect factor such as a heat stress. Accordingly, an object of the present invention (technical subject to be solved) is to efficiently heat and melt a plurality of pellets in a short period of time, and maintain a melting temperature of the pellet, and inject the melted resin with superior quality.

Therefore, in order to solve the above-described problem, as a result of strenuous efforts by inventors of the present invention, according to a first aspect of the present invention, there is provided an injection device in a molding machine, including: a cylinder including a pellet supply port; a cylinder-shaped plunger disposed in the cylinder and reciprocating in an axial direction thereof; a driving unit reciprocally moving the plunger in the axial direction; a melting instrument with a plurality of melting holes, which are cone-shaped passages, formed in a cylinder-shaped instrument body to communicate from inflow-side large openings to outflow-side small openings; a nozzle provided on an injection side of the cylinder; and a heating unit heating the melting instrument, wherein the melting instrument is disposed between the plunger and the nozzle, a face, on which the plurality of inflow-side large openings of the melting instrument are formed, is set as an inflow side face opposed to a tip-end of the plunger, and a face opposed to the nozzle on an opposite side to the inflow side face is set as an outflow side face, and a diameter of the tip-end of the plunger set to be the same as a diameter of the outflow side face of the melting machine.

According to a second aspect of the present invention, in the injection device in the molding machine according to the first aspect, the inflow side face and the outflow side face have the same diameter in the instrument body of the melting machine. According to a third aspect of the present invention, in the injection device in the molding machine according to the first aspect, the outflow side face has a larger diameter than the inflow side face in the instrument body of the melting machine.

According to a fourth aspect of the present invention, in the injection device in the molding machine according to any one of the first, second or third aspect, in the cylinder, an exhaust hole is formed between a movement range of a pressing tip-end portion of the plunger and the inflow side face of the melting instrument. According to a fifth aspect of the present invention, in the injection device in the molding machine according to anyone of the first, second, third or fourth aspect, each of the melting holes of the melting instrument is cone-shaped.

According to a sixth aspect of the present invention, in the injection device in the molding machine according to any one of the first, second, third or fourth aspect, each inflow-side large opening of the adjacent melting holes is formed into substantially a polygonal shape, and a portion as a boundary between adjacent inflow-side large openings is formed into substantially a linear blade shape, with the portion provided in a plurality being close to each other.

According to a seventh aspect of the present invention, in the injection device in the molding machine according to any one of the first, second, third, fourth, fifth or sixth aspect, an air vent section constituted of a plurality of small holes is formed in an area in a peripheral direction near a supply port portion of the pellet supply port in the cylinder.

According to the first aspect of the present invention, the melting instrument has on its body, the melting holes formed in a state of a plurality of conical passages, with one side in the hole forming direction of the melting hole set as an inflow-side large opening, and the other side thereof set as an outflow-side small opening. The melting instrument is disposed between the plunger and the nozzle in the cylinder, wherein the face at the side of the inflow-side large opening of the melting holes is set as the inflow side face opposed to the tip-end of the plunger. Further, the face opposed to the nozzle on the opposite side to the inflow side face is set as the outflow side face. Then, the shape of the tip-end face of the plunger is the same as the shape of the inflow side face of the melting machine.

With this structure, a plurality of pellets are charged into the cylinder, and if the plurality of pellets are pressed onto the melting instrument by the plunger by starting the driving unit, the plunger is moved toward the melting instrument side by the driving unit, and the pellet is pressed onto the plunger and enters into the melting hole from the inflow-side large opening, because the inflow side face of the melting instrument is opposed to the tip-end of the plunger. In this process, the temperature of the melting instrument is set to a sufficient melting temperature by the heating unit.

Further, the shape of the tip-end face of the plunger is the same as the shape of the inflow side face of the melting machine. Therefore, since the cross-sectional shape of the cylinder in the movement range of the plunger and the cross-sectional shape of the plunger are the same (or substantially the same), there is no wider space than an outer peripheral side face of the plunger, between the tip-end face of the plunger and the inflow side face of the melting instrument.

Namely, the tip-end face of the plunger works effectively, to thereby allow a plurality of pellets pressed by the tip-end of the plunger to directly enter into a plurality of inflow-side large openings of the melting holes formed on the melting instrument with no waste at all. Accordingly, the pellet does not remain between the tip-end of the plunger and the inflow side face of the melting instrument, and an obstacle in repeated use can be prevented.

The pellet that enters into the melting hole from the inflow-side large opening by being pressed by the plunger, is in a state of being surrounded by an inner peripheral wall face of the melting hole. The melting hole is a cone-shaped passage, and therefore the inner peripheral wall face becomes narrower gradually, thus also making gradually smaller an interval between the inner peripheral wall face and a circumference of the pellet, with a movement of the pellet to the outflow-side small opening side.

The melting instrument itself is heated to the melting temperature of the pellet by the heating unit, thus melting the pellet. At this time, all circumference of the pellet is in a state of being surrounded by the inner peripheral wall face of the melting hole, thus making it possible to substantially uniformly melt the pellet from the outer periphery to the center in a well-balanced state. In addition, in a process of moving the pellet through the melting hole from the inflow-side large opening to the outflow-side small opening, the melting instrument is capable of maintaining the temperature to a sufficient melting temperature while heating the pellet, with no influence on the temperature of the melted pellet, if being heated to a high temperature once by the heating unit, because the instrument body has a large heat capacity.

Then, the pellet is pressed by a plurality of pellets that enter in sequence from the outflow-side large openings while substantially uniformly melted toward the center from the outer periphery, and is moved to the outflow-side small opening of the melting hole. During this process as well, melting of the pellet is in progress, resulting in most of the portion melted when passing through approximately an intermediate portion in an axial direction (a longitudinal direction) of the melting hole, and melting of the circumferential pellet is also in progress with increasing speed, accelerated by a melting heat of the melting instrument. The pellet is completely melted at a highest temperature in the vicinity of the outflow-side small opening, and therefore the resin in an excellent melting state can be injected from the nozzle.

Thus, in the present invention, the melting instrument has a plurality of melting holes in a state of cone-shaped passages, in the instrument body section, and by enter of the pellet pressed by the plunger into the plurality of melting holes in the cone-shaped passages heated to the melting temperature by the heating unit, from the inflow-side large opening at a large openings side, well-balanced melting of the pellet is achieved, and a high temperature state can be maintained due to a large heat capacity of the melting instrument, and the melting is accelerated and the melting speed is also increased, and an injection time from the nozzle can be tremendously shortened, and the work efficiency of injection molding can be improved.

Further, the pellet enters into the melting hole of the melting instrument from the inflow-side large opening, and is surely melted while moving through the melting hole toward the outflow-side small opening, and only the pellet that enters into the melting hole is melted. Therefore, the pellet is not exposed to thermal or mechanical stress for a long time in the cylinder. Accordingly, a molded object with superior quality can be obtained. In addition, owing to high melting efficiency, there is no necessity for charging materials excessively, and therefore the cylinder can be miniaturized, thus contributing to saving power and saving resources.

Particularly, in the melting instrument, the temperature of the resin reaches highest at an outflow-side small opening portion. Therefore, an optimal temperature state and a highest temperature state can be set, which are required temperature states immediately before injection. Thus, a shortest period of time is required for the highest temperature state, to thereby not allow the resin to be degraded, thus realizing molding with high quality. Namely, the melting instrument has a structure that the temperature of the resin is raised to an optimal temperature immediately before injection, in a last process of melting the resin.

According to the first aspect of the invention, the instrument body of the melting machine is formed into a cylindrical shape, and the tip-end face of the plunger is formed into a circular shape, and the diameter of the tip-end face of the plunger is set to be the same as the diameter of the inflow side face of the melting machine. Thus, the inner peripheral side face of the cylinder is also formed into a circumferential shape similarly to the plunger, thus realizing miniaturization of the cylinder, the melting instrument, and the plunger, realizing a compact device as a whole, and realizing an optimal structure of a cylinder device.

Figures 9A, 9B:
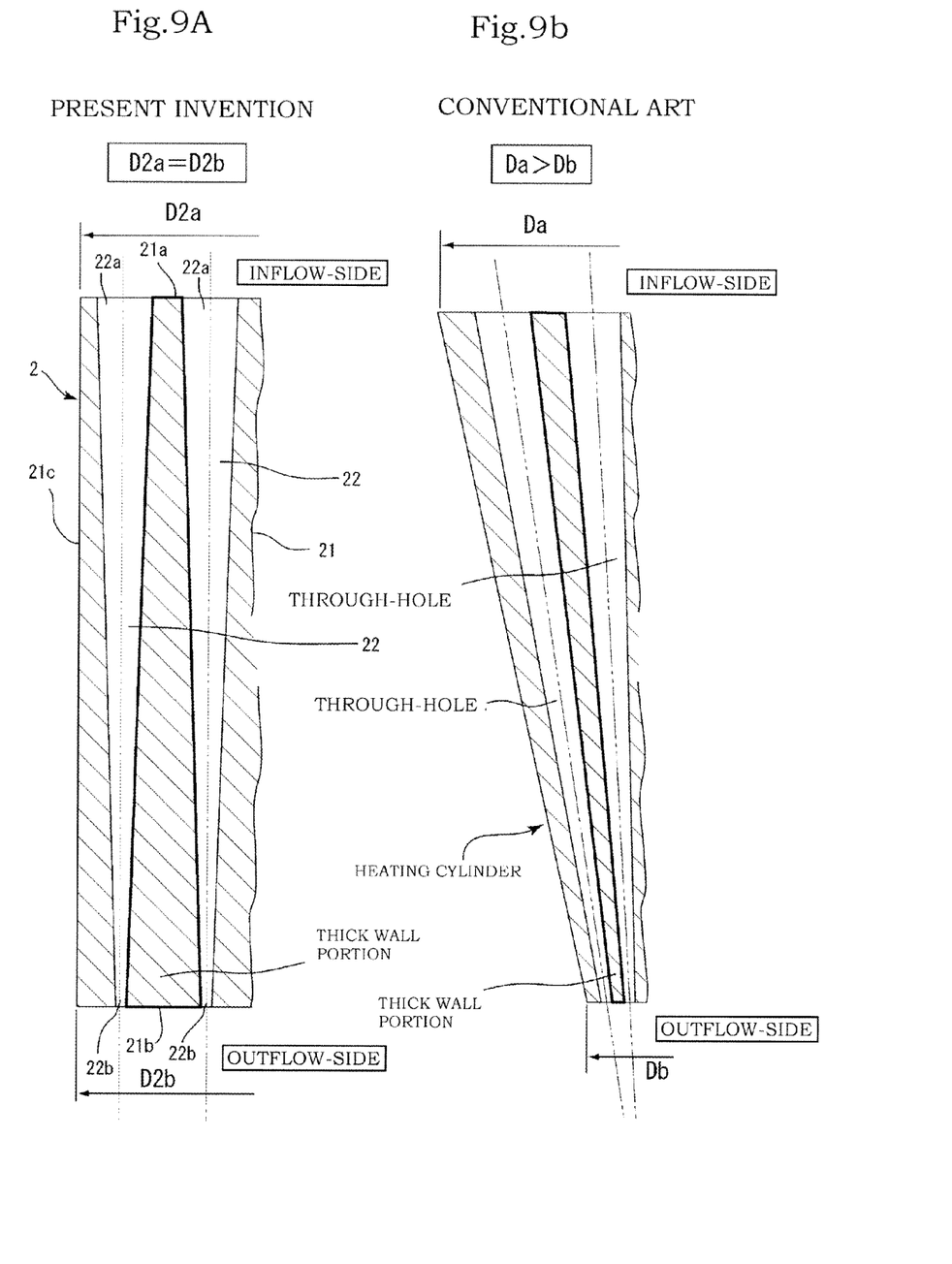
FIG. 9A is a partially expanded cross-sectional view of the melting instrument according to the present invention.
FIG. 9B is a partially expanded cross-sectional view of a conventional technique (Japanese Examined Patent Publication No. S36-9884).

Further, the melting instrument has the melting holes formed into a plurality of cone-shaped passages, in the instrument body formed into a cylindrical shape, wherein these plurality of melting holes are arranged approximately in a parallel state, without being converged toward the outflow side face from the inflow side face (see FIG. 9A). Thus, a plurality of outflow-side small openings is not crowded, and can be uniformly arranged respectively. Accordingly, the heat capacity of the melting instrument itself can be made sufficiently large, and the thick wall portion (solid portion) between the melting holes can be secured so as to be sufficiently larger toward the outflow side face, and a large heat capacity can also be secured between the melting holes (see FIG. 9A).

Therefore, in a process of moving the pellet through the melting hole toward the outflow-side small opening from the inflow-side large opening, if the melting instrument is heated to a high temperature once by the heating unit, the high temperature is maintained by large heat capacity, thus not decreasing the temperature of the melted pellet and maintaining the temperature of the pellet to a sufficient melting temperature, so that excellent melted resin pellets p can be flowed-out from the outflow-side small openings.

According to the second aspect of the present invention, in the instrument body of the melting machine, the diameters of the inflow side face and the outflow side face are set to be the same diameters. Therefore, the melting instrument has an exact cylindrical shape, thus making it easy to manufacture the melting instrument and easy to assemble the melting instrument into the cylinder. According to the third aspect of the present invention, in the instrument body of the melting machine, the diameter of the outflow side face is formed larger than the diameter of the inflow side face. Therefore, the thick wall portion can be made larger toward the outflow side face of the instrument body, thus also increasing the heat capacity in the vicinity of the outflow side small opening. Accordingly, the heating temperature by the heating unit can be maintained in a further stable state.

According to the fourth aspect of the present invention, the exhaust hole is formed between the movement range of the pressing tip-end portion of the plunger and the inflow side face of the melting instrument, in the cylinder. Therefore, when the pressing tip-end portion of the plunger moves toward the inflow side face of the melting instrument, air can be discharged from the exhaust holes even in a case of an increase of a pressure of the air remained between the pressing tip-end portion of the plunger and the inflow side face of the melting instrument.

Accordingly, the pressing tip-end portion of the plunger can be approached to the inflow side face of the melting instrument almost in contact with the inflow side face, and a plurality of pellets can be sent into the melting holes of the melting instrument without waste. Further, the exhaust hole is formed so that the air remains in a slight space between pellets, when the pellet is compressively charged between the pressing tip-end portion of the plunger and the inflow side face of the melting instrument. If the plunger is continued to be pressed in this state, there is a possibility that the air enters into the melted resin as bubbles. Therefore, the air becoming the bubble as described above can be escaped through the exhaust hole, before the pellet is melted.

Next, according to the fifth aspect of the present invention, the melting hole of the melting instrument is formed into a cone-shape. Therefore, the outer periphery of the pellet is easily surrounded by the inner peripheral wall face of the melting hole, irrespective of the shape of the pellet. Therefore substantially uniform and well-balanced melting of the pellet is achieved.

According to the sixth aspect of the present invention, each inflow-side large opening of the adjacent melting holes is formed into substantially a polygonal shape, and a portion as a boundary between adjacent inflow-side large openings is formed into substantially a linear blade shape. Therefore, the pellet pressed by the inflow-side large opening side plunger of the melting hole in the melting instrument, is crushed finely at a blade-shaped portion on the boundary between inflow-side large openings as described above, thus allowing the pellet to further easily enter from the inflow-side large opening to thereby accelerate the melting of the pellet.

According to the seventh aspect of the present invention, the air vent section constituted of a plurality of small holes is formed in the area in the peripheral direction near the pellet supply port portion of the cylinder. Therefore, a plurality of pellets can be easily sent into the cylinder. Namely, if the air remains in the cylinder, such a remained air can be discharged from a plurality of small holes, to thereby prevent a situation that the pellet sent into the cylinder is hardly allowed to enter.

Further, owing to the plurality of small holes of the air vent section, a material area that forms the cylinder can be reduced, thus also reducing the thermal conductivity, and a high temperature state extending to the driving unit can be prevented, and heat dissipation can be set in an excellent state. In addition, the plurality of small holes enables visual observation of inside of the cylinder, and therefore residual quantity of the pellet charged into the cylinder can be confirmed visually.

DESCRIPTION OF THE PREFERRED EMBODIMENTS

Figure 1A:
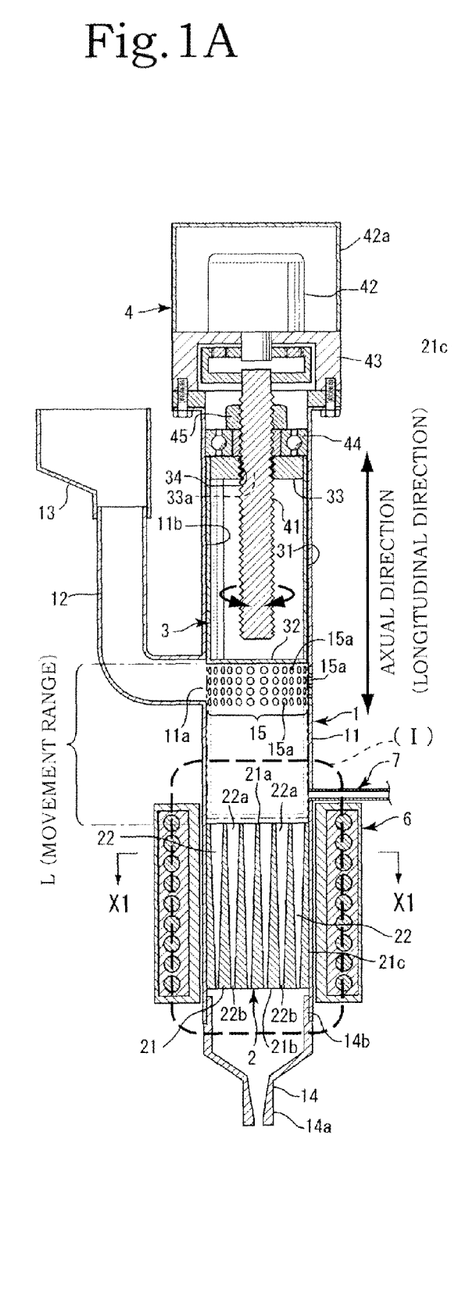
FIG. 1A is a vertical side view of an injection device according to the present invention.

The present invention will be described hereafter based ore the drawings. As shown in FIG. 1A, the present invention is mainly constituted of a cylinder 1; a melting instrument 2 for melting pellets p; a plunger 3; a driving unit 4 for driving the plunger 3; and a heating unit 6. The melting instrument 2 and the plunger 3 are disposed inside of the cylinder 1.

Figures 2A, 2B, 2C, 2D:
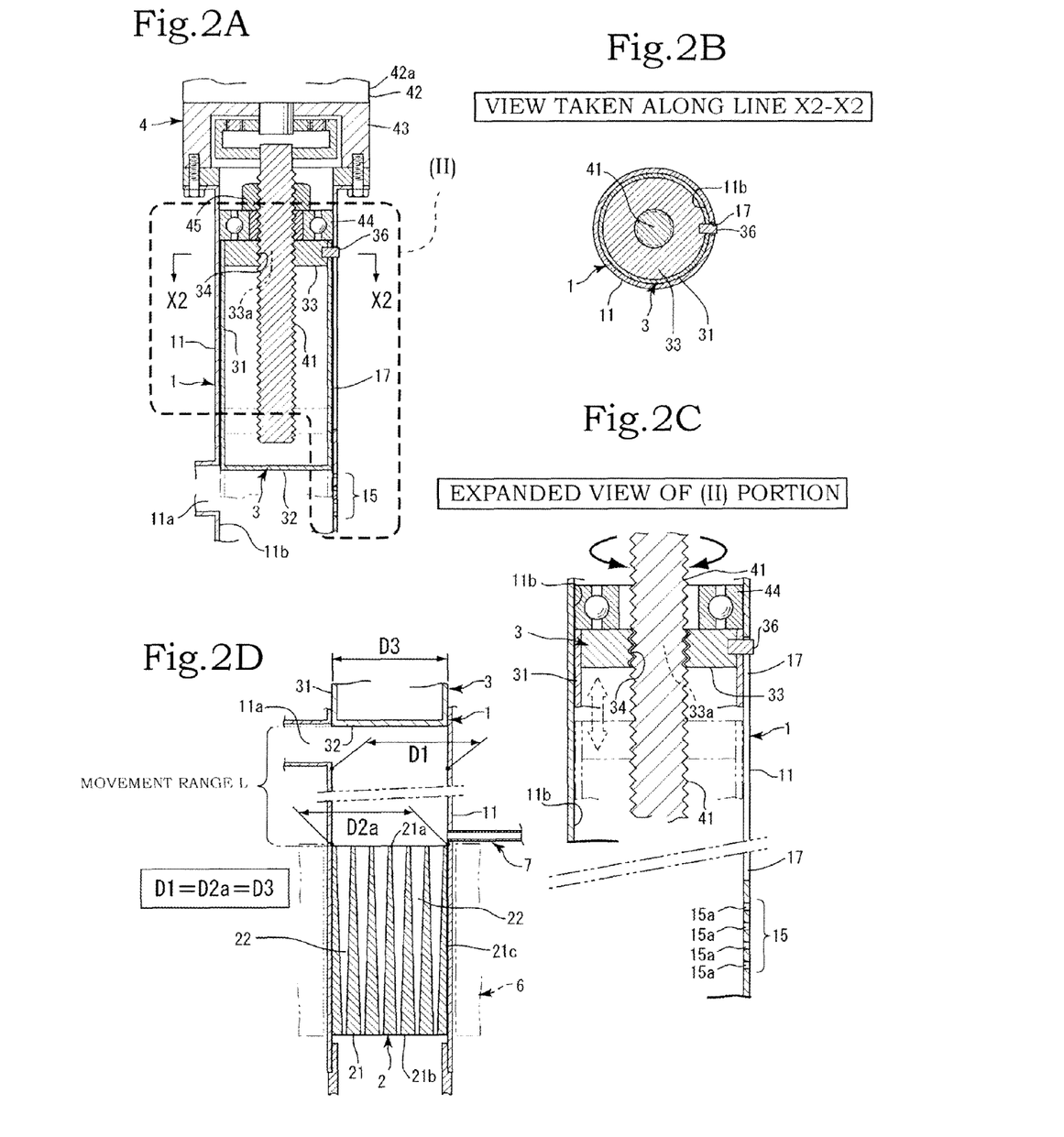
FIG. 2A is a partial vertical side view of the injection device according to the present invention.
FIG. 2B is a cross-sectional view of FIG. 2A taken along the line X2-X2.
FIG. 2C is an expanded view of (II) portion of FIG. 2A.
FIG. 2D is a vertical side view of an essential part showing a state that diameters of a melting instrument and a plunger are the same.

A nozzle 14 is mounted on one end side of the cylinder 1 in an axial direction (longitudinal direction), and the driving unit 4 is mounted on the other end side in the axial direction (longitudinal direction), so that the plunger 3 is reciprocally moved though the cylinder 1 in the axial direction (longitudinal direction) by the driving unit 4 (see FIGS. 2A to 2C). The shape of a tip-end face of the plunger 3 is the same shape as the shape of an inflow side face 21a of the melting machine 2.

The cylinder 1 is made of a material which needs to be speedily heated, and iron or stainless with large content of iron is preferable. The cylinder 1 is constituted of a cylinder body section 11, a supply tube 12, and a hopper 13. The cylinder body section 11 is a cylindrical member, and substantially a cylinder-shaped space is formed on the inward side surrounded by an inner peripheral side face 11b. A heating area heated by the heating unit 6 as will be described later, is formed in a part of the cylinder body 11 in the axial direction (longitudinal direction).

A pellet supply port 11a is formed in an intermediate portion of the cylinder-shaped cylinder body section 11 in the axial direction (longitudinal direction) (see FIGS. 1A and 2A). The tubular supply tube 12 is formed from a peripheral edge of the pellet supply port 11a on an outer peripheral side face of the cylinder body section 11, and the hopper 13 is provided on an end portion of the supply tube 12 (see FIG. 1A). The cylinder body section 11 with a thickness dimension of about 2 mm is preferable.

Figures 3A, 3B, 3C, 3D:
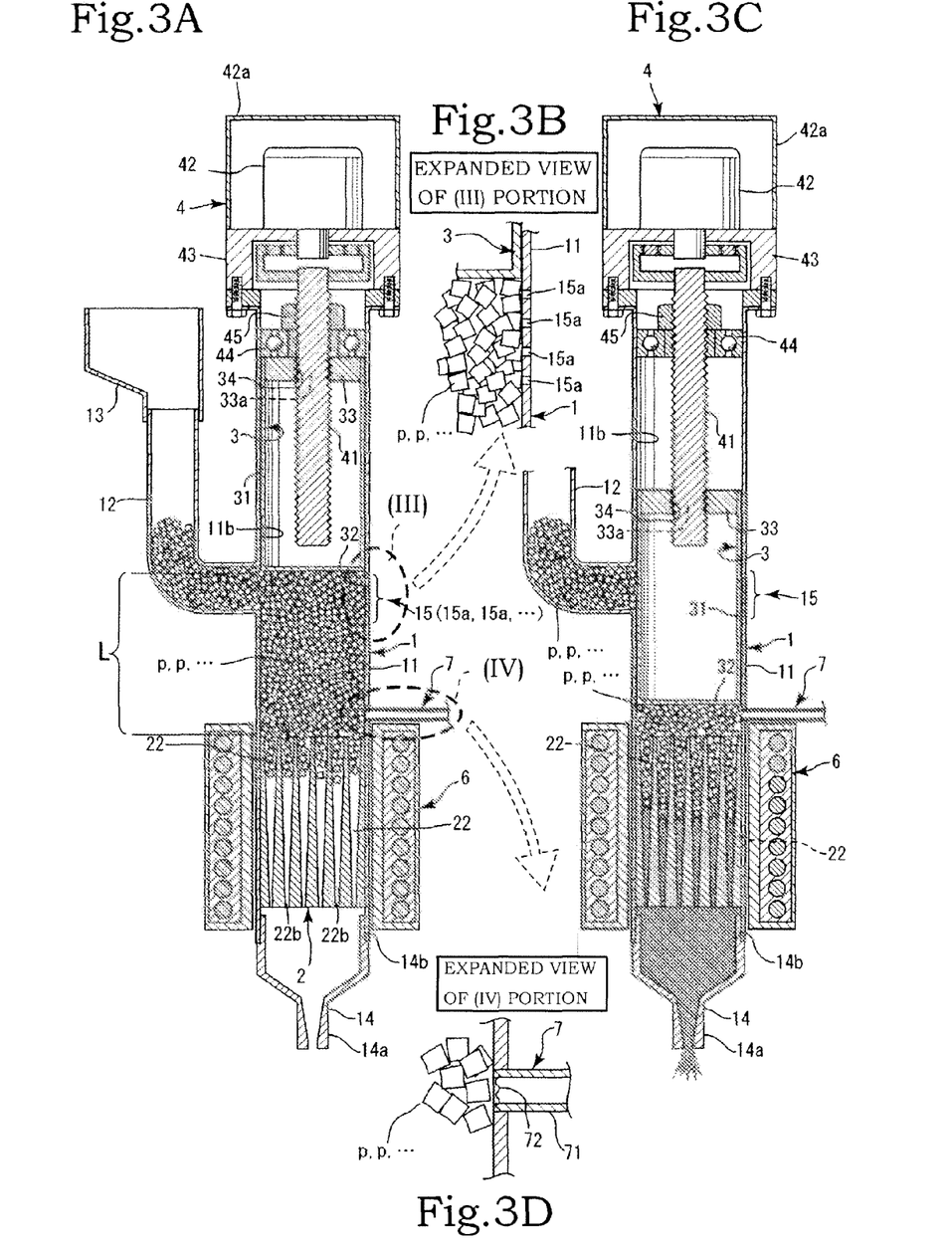
FIG. 3A is a vertical side view showing a state that a plurality of pellets are charged into the injection device according to a first embodiment.
FIG. 3B is an expanded view of (III) portion of FIG. 3A.
FIG. 3C is a vertical side view showing a state that a pellet extruded to the melting instrument by the plunger, passes the melting instrument and is melted and injected from the nozzle.
FIG. 3D is an expanded view of (IV) portion of FIG. 3A.

A plurality of pellets p can be charged into the hopper 13, and the charged pellets p are sent into the cylinder body section 11 from the pellet supply port 11a thorough the supply tube 12 (see FIG. 3A). Further, although not shown particularly, an air pressure device is provided in the supply tube 12, thereby forcibly charging the pellets p by air pressure in some cases.

An air vent section 15 is provided in the vicinity of the pellet supply port 11a of the cylinder body section 11 (see FIGS. 1A and 2C). Regarding the pellets p sent into the cylinder body section 11 from the supply tube 12 as described above, the air vent section 15 has a function of preventing difficulty in enter of the pellets p into the cylinder body section 11 due to the air remained in the cylinder body section 11.

The air vent section 15 is formed by a plurality of small holes 15a to thereby escape the air remained in the cylinder body 11 to outside. Each small hole 15a constituting the air vent section 15 is formed sufficiently smaller than each pellet p, which is specifically a through-hole with a diameter of about 1 mm.

Small holes 15a of the air vent section 15 are formed so as to be arranged in the vicinity of the pellet supply port 11a along the peripheral direction, and as many holes as possible are preferably opened (see FIG. 1A). Regarding the plurality of pellets p sent into the cylinder body section 11 of the cylinder 1, if the air is remained in the cylinder body section 11, the remained air can be discharged from the plurality of small holes 15a and the plurality of pellets p can be easily entered at once.

Further, the material area that forms the cylinder body section 11 is reduced by the plurality of small holes 15a of the air vent section 15, and therefore the thermal conductivity can be reduced, thus preventing a high temperature state that affects the driving unit, etc., and also realizing excellent heat dissipation. Further, the plurality of small holes 15a of the air vent section 15 enable a visual observation of inside of the cylinder body section 11, and therefore presence/absence and residual quantities of the pellets p charged into the cylinder body section 11, can be observed from outside (see FIGS. 3A and 3B).

The nozzle 14 is mounted on one end side of the cylinder body section 11 in the axial direction (longitudinal direction). The nozzle 14 can be exchanged so as to change an aperture of an injection portion in accordance with a molding die used together with the injection device of the present invention. The nozzle 14 is constituted of an injection port 14a and a connecting section 14b (see FIG. 1A).

The injection port 14a is formed narrower than an inner diameter of the cylinder body section 11, and is formed as a part inserted into a gate of the molding die not shown. The connecting section 14b of the nozzle 14 and the cylinder body section 11 are attachably and detachably formed by a thread structure (external thread and internal thread). A material with excellent thermal conductivity is preferable as the material of the nozzle 14, and specifically beryllium copper or copper is preferable.

Figure 1B:
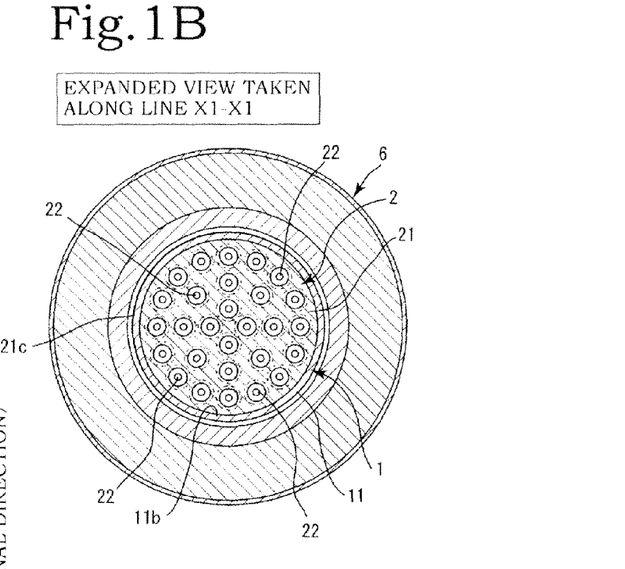
FIG. 1B is an expanded cross-sectional view of FIG. 1A taken along the line X1-X1.
Figure 1C:
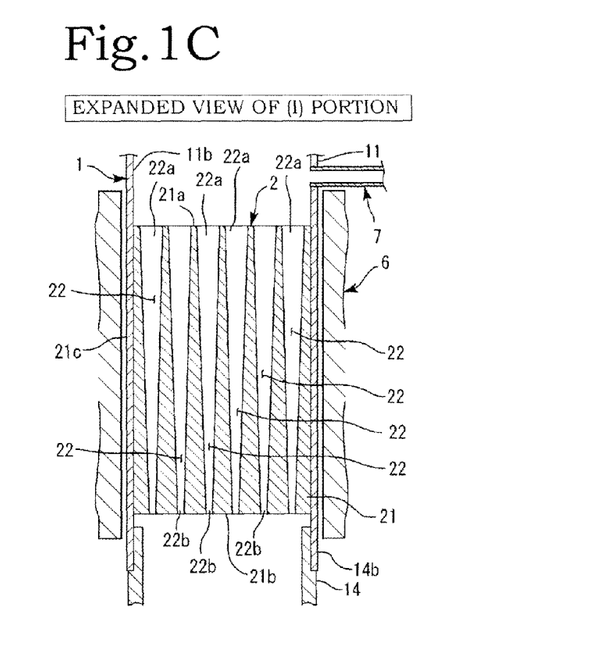
FIG. 1C is an expanded view of (I) portion of FIG. 1A.

In the melting instrument 2, a plurality of melting holes 22 are formed in an instrument body section 21 (see FIG. 1 and FIG. 5, etc.). The melting instrument 2 is formed into substantially a cylindrical shape, and further specifically the instrument body section 21 is formed into the cylindrical shape. The material with large heat capacity and excellent thermal conductivity is preferable as the material of the instrument body section 21. Specifically, copper or beryllium copper is used. The instrument body section 21 is firmly fixed to inside of the cylinder body section 11 of the cylinder 1 in the vicinity of the nozzle 14 mounting side (see FIG. 1A).

Specifically, the instrument body section 21 of the melting instrument 2 is firmly fixed to an inner peripheral side face 11b of the cylinder body section 11 by a fixing unit such as press fitting. Particularly, the plurality of pellets p pressed by a large pressure imparted by the plunger 3 as will be described later, are received by the melting instrument 2, and therefore the cylinder body section 11 and the melting instrument 2 are extremely firmly fixed to each other. The melting instrument 2 is positioned between the nozzle 14 and the plunger 3 in the cylinder body section 11 (see FIG. 1A).

Further, by firmly fixing the inner peripheral side face 11b of the cylinder body section 11 and the instrument body section 21 of the melting instrument 2, and by air-tightly connecting them with each other, excellent thermal conductivity from the cylinder body section 11 to the melting instrument 2 can be obtained, thus speedily heating the melting instrument 2 by the heating unit 6. As described above, the instrument body section 21 of the melting instrument 2 is formed into a cylinder-shape, and in the instrument body section 21, a face at the side opposed to the pressing tip-end face 32, being the face of the tip-end of the plunger 3, and at the side into which the plurality of pellets p are flowed, is called the inflow side face 21a.

Also, the face opposed to the nozzle 14 on the opposite side to the inflow side face 21a, and at the side where the melted pellets p are flowed-in, is called an outflow side face 21b. Also, an outer peripheral side face of the instrument body section 21 is called a circumferential side face 21c. The instrument body section 21 is formed into a cylindrical shape as described above, and is formed into an exact cylindrical shape, wherein a diameter D2a of the inflow side face 21a, a diameter D2b of the outflow side face 21b, and the circumferential side face 21c are the same at any position along the axial direction (see FIG. 5A). Further, the melting instrument 2 of FIG. 1 to FIG. 4 also has the aforementioned exact cylindrical shape.

Namely, D2a=D2b is established.

Figure 8A:
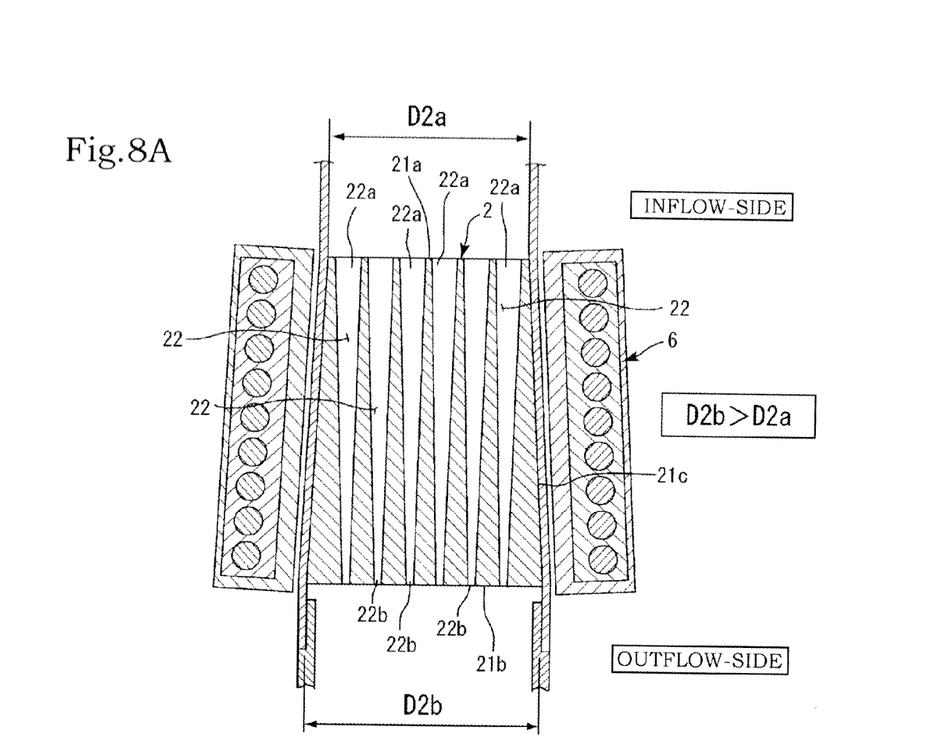
FIG. 8A is a vertical side view of the melting instrument according to another embodiment.
Figure 8B:
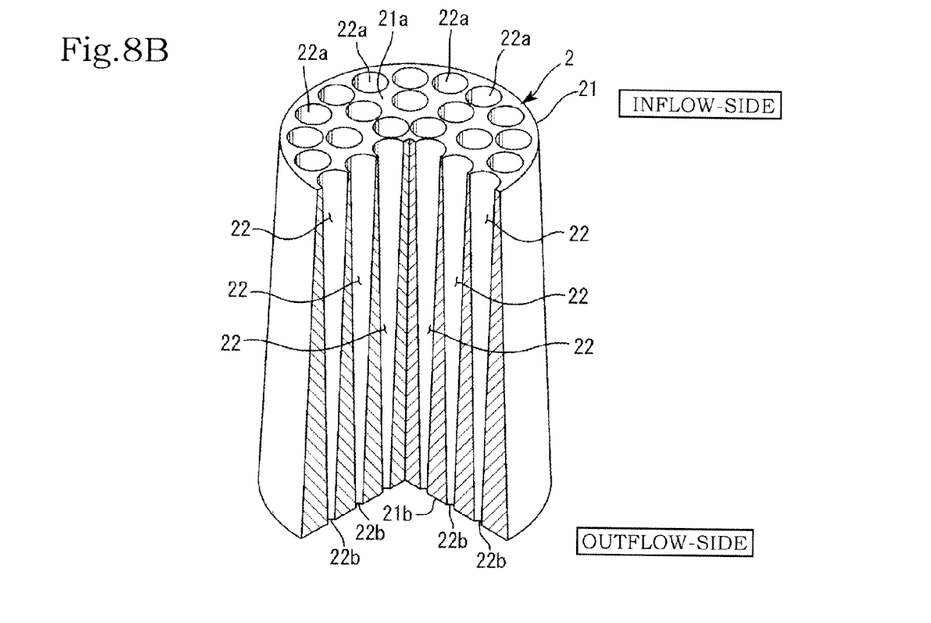
FIG. 8B is a perspective view of the melting instrument according to another embodiment.

Further, the cylindrical shape of the instrument body section 21 also includes the shape close to the cylindrical shape such as a circular truncated cone, in which the circumferential side face 21c is formed in a tapered shape so as be slightly widened toward the outflow side face 21b from the inflow side face 21a, with the diameter D2b of the outflow side face 21b slightly larger than the diameter D2a of the inflow side face section 21a (see FIG. 8).

Namely, D2b>D2a is established.

Further, although not shown, the cylindrical shape of the instrument body section 21 may also be the shape close to the cylindrical shape in which the circumferential side face 21c is formed in a tapered shape so as to be slightly narrowed toward the outflow side face 21b from the inflow side face 21a, with the diameter D2a of the inflow side face 21a extremely slightly larger than the diameter D2b of the outflow side face 21b.

Figures 5A, 5B, 5C:
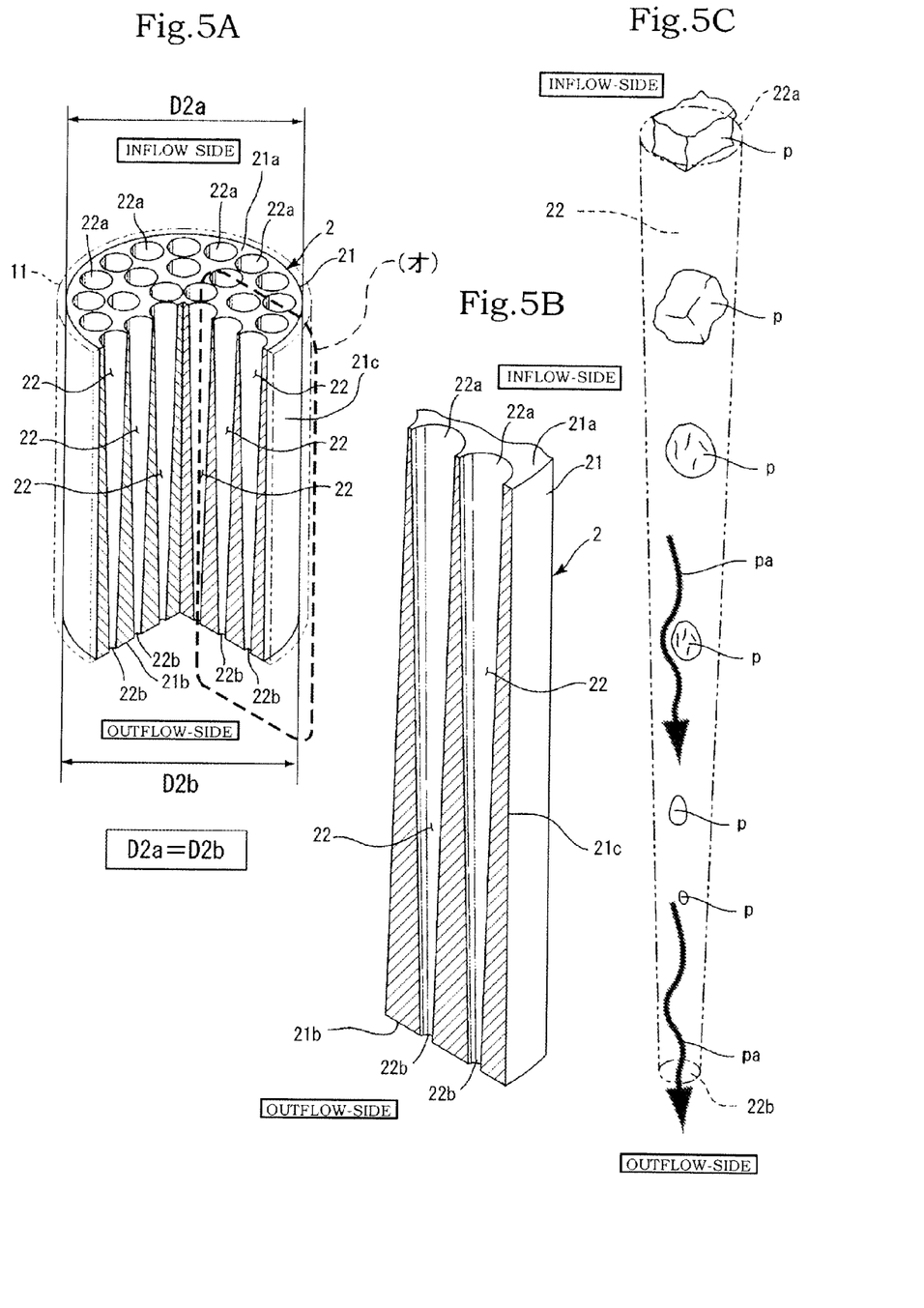
FIG. 5A is a perspective view showing a partially cut melting instrument.
FIG. 5B is an expanded view of (V) portion of FIG. 5A.
FIG. 5C is a schematic perspective view showing a state that the pellets are moved through the melting holes while being melted, toward the outflow-side small openings from the inflow-side large openings.
Figure 6A:
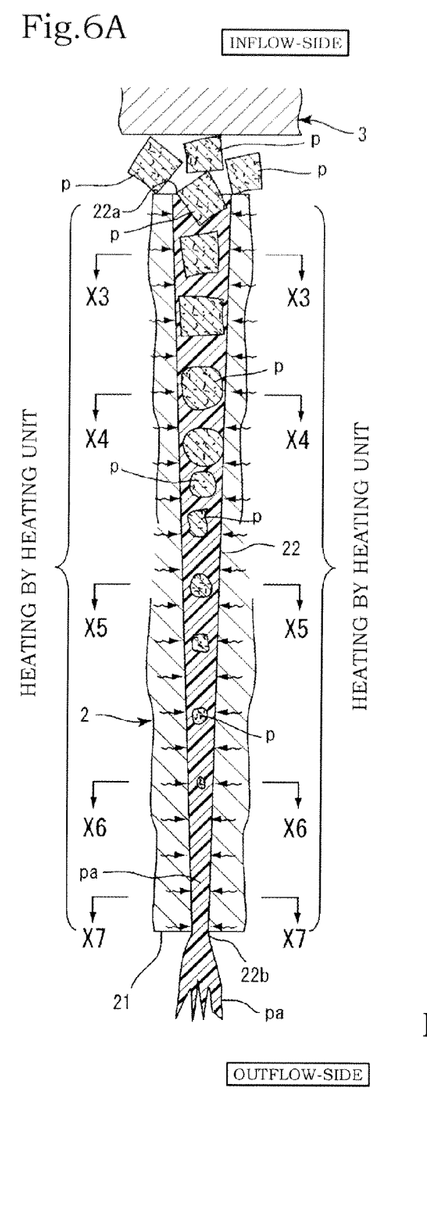
FIG. 6A is an expanded vertical side view of a melting hole showing a state that the pellets are moved therethrough while being melted, toward an outflow-side small opening from an inflow-side large opening.
Figure 6B:
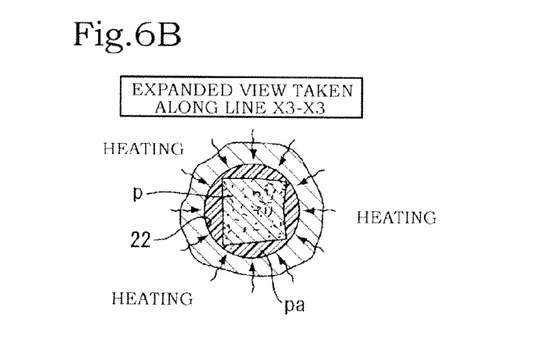
FIG. 6B is an expanded cross-sectional view of FIG. 6A taken along the line X3-X3.
Figure 6C:
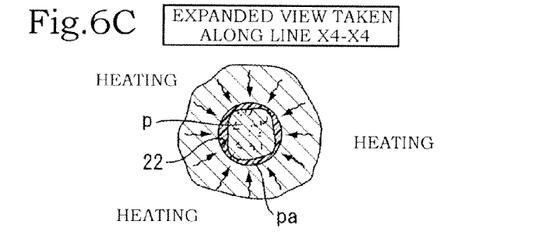
FIG. 6C is an expanded cross-sectional view of FIG. 6A taken along the line X4-X4.
Figure 6D:
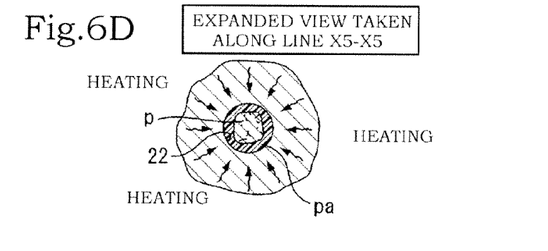
FIG. 6D is an expanded cross-sectional view of FIG. 6A taken along the line X5-X5.
Figure 6E:
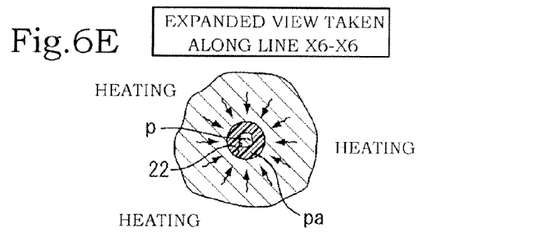
FIG. 6E is an expanded cross-sectional view of FIG. 6A taken along the line X6-X6.
Figure 6F:
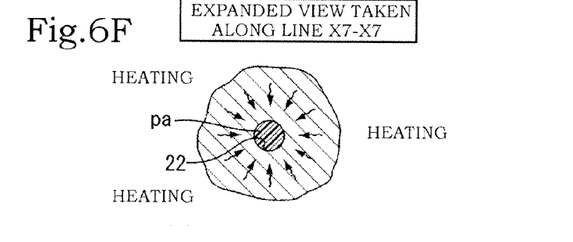
FIG. 6F is an expanded cross-sectional view of FIG. 6A taken along the line X7-X7.

Melting holes 22 are formed along the axial direction (longitudinal direction) of the instrument body 21 (see FIGS. 5A, 5B, and 6A). More specifically, each melting hole 22 is a cone-shaped through-hole, formed into a tunnel shape or tube shape (see FIGS. 5A and 5B). In the melting hole 22, the aforementioned cone-shaped through-hole is formed so that cross-sectional shapes of a plurality of arbitrary positions orthogonal to a hole forming direction become narrower from wider shapes to narrower shapes (see FIGS. 5B, 5C, and 6A), and specifically the cone-shaped through-hole is a hole having a space of a cone shape or a pyramid shape.

In the present invention, particularly, the cone shape of the melting hole 22 is preferably a conical shape, in which the diameter is gradually decreased from large to small (see FIG. 5). As described above, the melting hole 22 is the hole having the cone-shaped space, and therefore sizes of openings at both ends of the melting hole 22 are different from each other. Therefore, large opening sides of the melting holes 22 are called the inflow-side large openings 22a into which the pellets p are flowed-in (see FIGS. 1C, 5A, 5B, and 6A).

Further, small opening sides of the melting holes 22 are called the outflow-side small openings 22b. Namely, the melting holes 22 are passages that communicate with the outflow-side small openings 22b from the inflow-side large openings 22a, wherein cross-sectional faces are gradually narrowed toward the outflow-side small openings 22b from the inflow-side large openings 22a. The inflow-side large openings 22a are positioned on the inflow side face 21a of the instrument body section 21, in such a manner as being opposed to (or facing) the pressing tip-end portion 32 of the plunger 3. Further, the outflow-side small openings 22b are positioned on the outflow side face 21b, in such a manner as being opposed to (or facing) the nozzle 14 (see FIG. 1A).

As described above, inflow-side large openings 22a of a plurality of melting holes 22 are arranged on the inflow side face 21a of the melting instrument 2, and the pellets p are flowed into the inflow-side large openings 22a opposed to the pressing tip-end portion 32 of the plunger 3, and therefore the inflow side face 21a is called the inflow-side of the melting instrument 2.

Also, outflow-side small openings 22b of the plurality of melting holes 22 are arranged on the outflow side face 21b of the melting instrument 2, and the pellets p are flowed-out from the outflow-side small openings 22b opposed to the nozzle 14, and therefore the outflow side face 21b is called the outflow-side of the melting instrument 2. The inflow-side and the outflow-side of the melting instrument 2 are shown in the figure.

In a case that the melting hole 22 is formed as the cone-shaped hole, the cross-sectional shape of a part orthogonal to the hole forming direction along the axial direction (longitudinal direction) is respectively a circular shape (see FIGS. 5C and 6). Each inflow-side large opening 22a of the melting hole 22 has a size allowing the whole body of one pellet p to enter therefrom, and has a size allowing at least a part (one portion) of the pellet p to enter therefrom. A specific size of the inflow-side large opening 22a is about 3 to 4 mm, which is a diameter that allows the pellets p to easily enter therefrom.

Further, each outflow-side small opening 22b has a diameter of about 1 mm, in which the pellets p are in a melted state. The cross-sectional shape of the melting hole 22 is substantially the tapered shape along the axial direction (longitudinal direction). In the figure, reference mark pa indicates melted and liquefied pellets (see FIGS. 3B, 4B to 4D, and 6). Namely, the melted and liquefied pellet p is called a pellet pa in a melted (or liquefied) state.

Figures 7A, 7B, 7C, 7D, 7E, 7F:
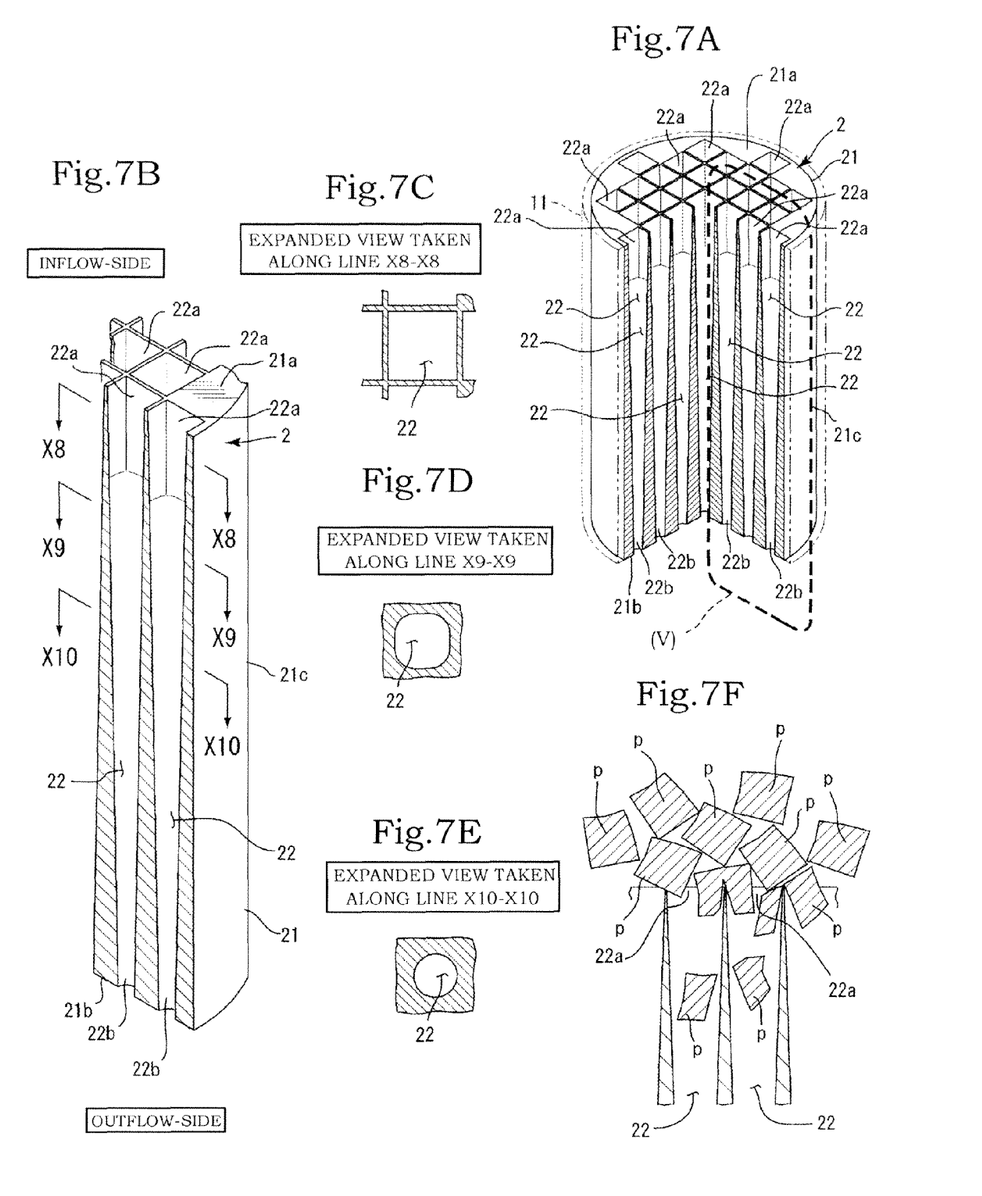
FIG. 7A is a perspective view showing a partially cut melting instrument of a second type.
FIG. 7B is an expanded view of (V) portion of FIG. 7A.
FIG. 7C is an expanded cross-sectional view of FIG. 7B taken along the line X8-X8.
FIG. 7D is an expanded cross-sectional view of FIG. 7B taken along the line X9-X9.
FIG. 7E is an expanded cross-sectional view of FIG. 7B taken along the line X10-X10.
FIG. 7F is an expanded view of an essential part at the side of the outflow-side large opening of the melting hole showing a state that the pellets are crushed.

As described above, the shape of the melting hole 22 is the cone shape along the axial direction (longitudinal direction), and in a case of the pyramid shape, it includes a quadrangular pyramid or a triangular pyramid in some cases. Further, there is also a combination type of the quadrangular pyramid and the cone-shaped pyramid (see FIG. 7). This type of the melting hole 22 is formed so that the inflow-side large opening 22a of the cone-shaped melting hole 22 is formed into substantially a polygonal shape, and the outflow-side small opening 22b of the melting hole 22 is formed into a circular shape.

Further specifically, according to further another embodiment, the inflow-side large opening 22a of the cone-shaped melting hole 22 is formed into substantially a square, so that an interval between the adjacent inflow-side large openings 22a becomes minimum (see FIGS. 7A to 7E). In this embodiment, a portion as a boundary between adjacent inflow-side large openings 22a is formed into substantially a linear blade shape (see FIG. 7B), and lattice shapes are formed by assembled inflow-side large openings 22a (see FIGS. 7A to 7C). Further, the shape of the inflow-side large opening 22a, which is formed into substantially the polygonal shape, also include triangular and hexagonal shapes in addition to the rectangle such as a square as described above, and edges of the adjacent inflow-side large openings 22a are preferably formed as parallel and linear edges.

Thus, the inflow-side large opening 22a is formed into substantially the square, thus constituting substantially the lattice shapes by a plurality of inflow-side large openings 22a (see FIGS. 7A to 7C) and the boundary between the adjacent inflow-side large openings 22a is formed into substantially the linear blade. With this structure, a peripheral edge of each inflow-side large opening 22a becomes sharp, thereby finely crushing the pellets p that enter into the inflow-side large openings 22a by a pressing force of the plunger 3, when the pellets p are caught by the blade-shaped part, and a state further easy to enter from the inflow-side large openings 22a can be obtained (see FIG. 7F).

The plunger 3 reciprocally moves in the axial direction (longitudinal direction) in the cylinder body section 11 by revolution of an external thread shaft 41 of the driving unit 4, and has a function of sending a plurality of pellets p into the melting holes 22 of the melting instrument 2 (see FIGS. 3 and 4). The plunger 3 is constituted of an outer peripheral side face 31, a pressing tip-end portion 32, and a bottom section 33, with the pressing tip-end portion 32, being a tip-end face, formed on one end of the outer peripheral side face 31 in the axial direction (longitudinal direction), and the bottom section 33 formed on the other end in the axial direction (longitudinal direction).

The plunger 3 is formed by these outer peripheral side face 31, pressing tip-end portion 32, and bottom section 33, and is formed into the cylindrical shape. The plunger 3 is configured not to be rotated in the peripheral direction, and is reciprocally moved in the axial direction (longitudinal direction) by the revolution of the external thread shaft 41 (see FIGS. 2A and 2B). Note that a non-rotation structure of the plunger 3 is a structure of not allowing an idling of the plunger 3 to occur in the peripheral direction.

In a specific non-rotation structure, a guide groove 17 is formed in the cylinder body section 11 of the cylinder 1, and a guide pin 36, which is loosely inserted into the guide groove 17, is mounted on the plunger 3 (see FIGS. 2A to 2C). In this embodiment, by loosely inserting the guide pin 36 into the guide groove 17, the guide groove 17 can be moved along the axial direction (longitudinal direction), and the idling of the plunger 3 in the peripheral direction can be surely prevented. In addition, although not shown, the guide pin 36 is mounted on an inner peripheral side at the cylinder 1 side, and the guide groove 17 is mounted on the plunger 3 in some cases.

As described above, the plunger 3 is configured to be moved only in the axial direction (longitudinal direction) in a non-rotation state in the peripheral direction in the cylinder body section 11 (see FIGS. 2A to 2C). The pressing tip-end portion 32 is formed in a flat face state. The pressing tip-end portion 32 has a function of pressing the plurality of pellets p toward the melting instrument 2, and sending the pellets p into the melting holes 22.

A through-hole 33a is formed on the bottom section 33 of the plunger 3, and an internal thread section 34 is formed in the through-hole 33a (see FIGS. 2A and 2B). The internal thread section 34 is screwed into the external thread shaft 41 of the driving unit 4 as will be described later, and the plunger 3 is reciprocally moved in the axial direction (longitudinal direction) together with the bottom section 33 in the cylinder body section 11.

Then, due to the movement of the plunger 3 toward the melting instrument 2 the pellets p are flowed into the melting holes 22 so as to be pushed thereinto from a plurality of inflow-side large openings 22a which are formed on the inflow side face 2a of the melting instrument 2 (see FIGS. 3 and 4). The material of the plunger 3 is iron or stainless. However, the material is not limited thereto, and any kind of the material is acceptable, provided that heat resistance and durability are satisfied.

A range from a state that the plunger 3 is most separated from the melting instrument 2 by the driving unit 4, to a state that the pressing tip-end portion 32 of the plunger 3 is set in substantially a contact state (including an approaching state) with the inflow side face 21a of the melting instrument 2, is called a movement range L of the plunger 3. Wherein, a diameter D3 of the plunger 3 is the same (approximately the same) as a diameter D2a of the inflow side face 2a of the melting instrument 2.

Also, the diameter of the plunger 3 is the same as the diameter D1 of the cylinder 1. Namely, the inner diameter D1 of the inner peripheral side face 11b of the cylinder 1, the diameter D2a of the inflow side face 2a of the melting instrument 2, and the diameter D3 of the pressing tip-end portion 32 of the plunger 3 are the same (approximately the same) (see FIG. 2D). Actually, the plunger 3 is a cylindrical body with the same diameter from one end to the other end in the axial direction (longitudinal direction). The plunger 3 slides in the cylinder 1, in a relation of a fitting structure in which the plunger 3 is loosely fitted into the cylinder 1. In the present invention, the diameter D3 of the pressing tip-end portion 32 of the plunger 3, and the inner diameter D2 of the cylinder 1 are set within substantially the same range.

Namely, D1=D2a=D3 is established.

Accordingly, the inner diameter D1 of the cylinder 1 is invariable in the movement range L in which the plunger 3 moves in a direction of the melting instrument 2 in the cylinder 1. Namely, the cylinder 1 has no portion on the inner periphery expanding outward. Therefore, all of the plurality of pellets p between the melting instrument 2 and the plunger 3 are sent to the melting instrument 2 without waste by the pressing tip-end portion 32 of the plunger 3, so that the pellets p enter into the melting instrument 2.

The driving unit 4 is constituted of an external thread shaft 41, a motor driving section 42, and a decelerating section 43 (see FIGS. 1A, 2A, and 2C). The external thread shaft 41 and the motor driving section 42 are connected to each other via the decelerating section 43, and the external thread shaft 41 is revolved by drive of the motor driving section 42. The decelerating section 43 decelerates the number of rotation of the motor driving section 42 to about ($\frac{1}{5}$) to ($\frac{1}{10}$) by a planetary gear mechanism, and increases a torque. An injection pressure, an injection amount, and an injection speed are controlled by controlling an input current of the motor driving section 42. A gear meshed with a planetary gear is formed in a part inserted into the decelerating section 43 of the external thread shaft 41.

The external thread shaft 41 of the driving unit 4 is screwed into the internal thread section 34 formed on the bottom section 33 of the plunger 3, so that the revolution of the external thread shaft 41 causes the plunger 3 to reciprocally move back and forth in the axial direction (longitudinal direction) (see FIGS. 2A to 2C). The external thread shaft 41 is disposed at a position, being a center of the diameter of the cylinder body section 11, by a bearing 44 firmly fixed to the inside of the cylinder body section 11. The external thread shaft 41 is fixed to the bearing 44 by a fixing nut 45 (see FIGS. 1A and 2A).

A motor housing 42a of the motor driving section 42 is firmly fixed by screwing to an end portion of the cylinder body section 11 of the cylinder 1 in the axial direction (longitudinal direction). Further, a heat insulating material is sometimes installed between the motor housing 42a and the cylinder body section 11. The heat insulating material functions to prevent the heat of the cylinder body section 11 from transmitting to the motor driving section 42 of the driving unit 4, and is made of ceramics, etc. Moreover, as another embodiment of the driving unit 4, although not shown, there is also a type that drives the plunger 3 by oil hydraulics or a type that drives the plunger 3 by air pressure.

The heating unit 6 functions to heat the melting instrument 2 which is firmly fixed to the inside of the cylinder body section 11 of the cylinder 1. Specifically, an electromagnetic induction device, namely, an induction heating (IH) coil is suitable as the heating unit 6, which is obtained by winding the IH coil around a heat insulating coil bobbin made of resin or ceramics.

The shape of the bobbin is set so as to obtain an optimal interval between the IH coil and the outer peripheral side face of the cylinder body section 11. It is suitable to set an input power to be variable from 0 to 1 Kw by a controller. A thermocouple is attached to the cylinder 1, so that a temperature of the cylinder 1 can be set to a set value. A band heater is sometimes used as another type of the heating unit 6. Further, the heating unit 6 is not limited to the aforementioned one, and any kind of the heating unit is acceptable provided that it can be used in the present invention.

The cylinder 1 includes an exhaust hole 7 so as to be positioned between the movement range L of the pressing tip-end portion 32 of the plunger 3 and the inflow side face 21a of the melting instrument 2. Thus, air can be discharged from the exhaust hole 7 even if the pressure of the air rises, the air being remained between the pressing tip-end portion 32 of the plunger 3 and the inflow side face 21a of the melting instrument 2, when the pressing tip-end portion 32 of the plunger 3 is moved toward the inflow side face 21a of the melting instrument 2 (see FIG. 3C).

Accordingly, the pressing tip-end portion 32 of the plunger 3 can approach the inflow side face 21a of the melting instrument 2 almost in contact with the inflow side face 21a. Further, the plurality of pellets p can be sent to the melting holes 22 of the melting instrument 2 without waste. An intake pipe 71 is mounted on the exhaust hole 7 and is connected to a vacuum pump in some cases, thus carrying out forcible exhaust so that inside of the cylinder 1 can be set in a vacuum state. Further, a net member 72 is mounted on the exhaust hole 7, so as to prevent the pellets p from leaking out from the exhaust hole 7 (see FIG. 3D). Thus, the exhaust hole 7 can be made larger than the pellet p, and exhaust can be carried out in a short period of time.

As described above, the shapes of the inner peripheral side face 11b of the cylinder 1, the melting instrument 2, and the plunger 3 are in a cylindrical state. However, the shapes are not necessarily limited to the cylindrical shape or the circular shape, and can be formed into another shape as needed. For example, the melting instrument 2 and the plunger 3 are formed into an oval shape in cross section, a gourd shape, or polygonal prisms such as triangular or quadrangular prisms, and in accordance with these shapes, the cross-sectional shape of the inner peripheral side face 11b of the cylinder 1 is also formed into the oval, triangular, or quadrangular shapes.

Next, an operation of the injection device of the present invention will be described mainly based on FIGS. 3, 4, and 6, etc. An initial position of the plunger 3 before being operated is at amounting side of the driving unit 4 in the axial direction (longitudinal direction) of the cylinder body section 11 (see FIG. 1A). The internal thread section 34 formed on the bottom section 33 of the plunger 3 is screwed into the external thread shaft 41.

In this state, the pellet supply port 11a of the cylinder body section 11 is in an open state, with no presence of the outer peripheral side face 31 of the plunger 3 (see FIG. 1A). Then, the plurality of pellets p are charged from the hopper 13, which are then passed through the supply tube 12, and are sent into the cylinder body section 11 from the pellet supply port 11a (see FIG. 3A).

When the motor driving section 42 of the driving unit 4 is started, the external thread shaft 41 is decelerated by the decelerating section 43 and is revolved. The guide pin 36 of the plunger 3 is loosely inserted into the guide groove 17 formed in the cylinder body section 11 of the cylinder 1, so that the plunger 3 can reciprocally move in the movement range L in the axial direction (longitudinal direction) along the guide groove 17 without idling in the peripheral direction (see FIGS. 2A to 2C).

In this structure, the driving unit 4 is started, then the motor driving section 42 is operated, and the external thread shaft 41 is revolved, to thereby operate the plunger 3. The external thread shaft 41 is rotated normally and reversely by the motor driving section 42, and the plunger 3 is moved toward the melting instrument 2 by such a normal and reverse rotation, almost in contact (including an approaching state) with the melting instrument 2, or returns to the driving unit 4 side. Thus, first, the plurality of pellets p are pressed toward the melting instrument 2 by the plunger 3 (see FIG. 4A). Simultaneously, the melting instrument 2 is heated by the heating unit 6, up to a temperature of melting the pellets p.

Thus, the plurality of pellets p pressed by the plunger 3 are enter and flow into the melting holes 22 from the plurality of inflow-side openings 22a (see FIGS. 4A, 4B, 6A, and 6B). As described above, each inflow-side large opening 22a has a size that allows at least a part (one portion) of each pellet p to enter therefrom. Normally, the inflow-side large opening 22a has a size that allows the whole body of the pellet p with an average size to enter from the inflow-side large opening 22a (see FIGS. 5C, 6A, and 6B).

Figure 4A:
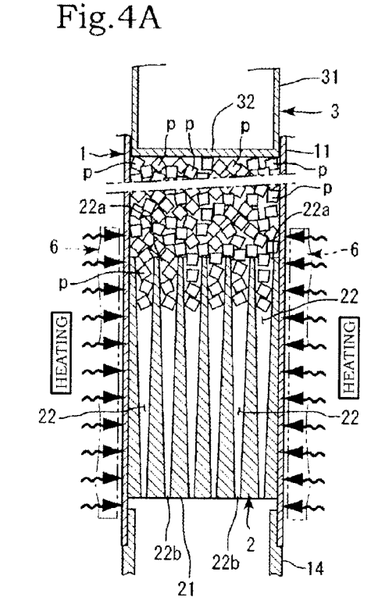
FIG. 4A is a vertical side view of an essential part showing a state that a plurality of pellets are charged into inflow-side large openings of the melting instrument in the injection device according to the first embodiment.
Figure 4B:
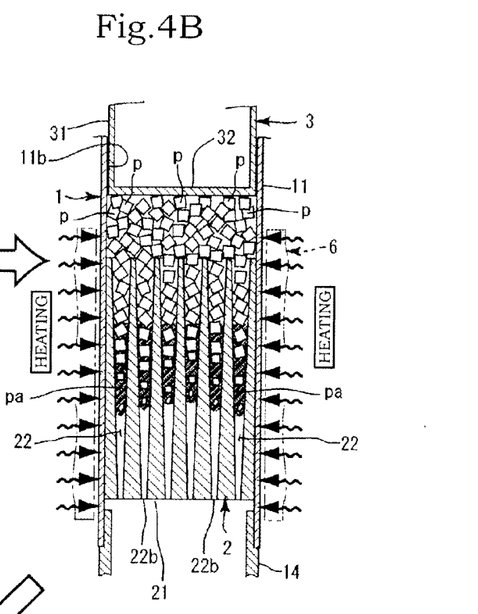
FIG. 4B is a vertical side view of an essential part showing a state that the plurality of pellets start to be melted in the melting holes.
Figure 4C:
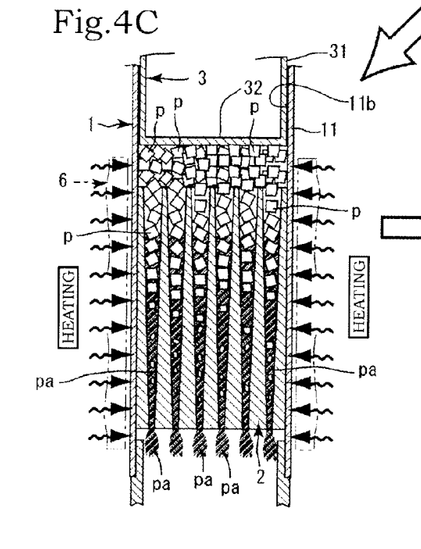
FIG. 4C is a vertical side view of an essential part showing a state that the plurality of pellets are extruded from outflow-side small openings while being melted in the melting holes.

Each of the pellets p that enter into the melting holes 22 is pressed toward the outflow-side small opening 22b by the pellets p that flow-in thereafter (see FIGS. 4B and 4C). As described above, the temperature of the melting instrument 2 is maintained to the temperature of melting the pellet p by the heating section 6.

Accordingly, the pellet p that enters from the inflow-side large opening 22a is melted toward its center, as it moves toward the outflow-side small opening 22b from the inflow-side large opening 22a (see FIGS. 6A and 6B to 6E). The pellet p is set so that its circumference is in a state of being almost uniformly surrounded by the inner peripheral wall face of the melting hole 22 in the initial state where the pellet p starts entering the inflow-side large opening 22a (see FIGS. 5C, 6B to 6D).

Then, the size of the pellet p is gradually reduced while being melted, as it moves through the melting hole 22 toward the outflow-side small opening 22b (see FIGS. 5C, 6B to 6E). Even if the pellet p moves toward the outflow-side small opening 22b while being melted, the circumference of the melted and contracted pellet p is still surrounded by the inner peripheral wall face of the melting hole 22, because the melting hole 22 is also gradually narrower (see FIGS. 6B to 6E). Therefore, the pellet p is melted speedily.

Namely, the circumference of the individual pellet p is approximately uniformly surrounded by the inner wall face of the melting hole 22 in contact with the inner wall face (or almost in contact with the inner wall face), and this state is always maintained (see FIGS. 6A, 6B to 6E). Then, the pellet p is further advanced to a narrower portion of the melting hole 22 as its melting is in progress, thus further accelerating the melting of the pellet p. In addition, since the pellet p is melted and liquefied inside of the melting hole 22, the melting of the pellet p sent thereafter is further accelerated by the heat of the already liquefied pellet pa (see FIG. 4C).

Figure 4D:
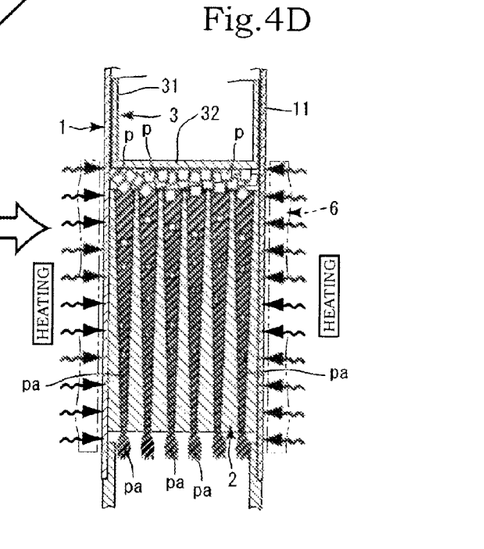
FIG. 4D is a vertical side view of an essential part showing a state that the plurality of pellets are extruded from the outflow-side small openings in a state of almost being melted in the melting holes.

Thus, the melting of the pellet p is in progress as the pellet p is advanced toward the inflow-side small opening 22b from the outflow side large opening 22a of the melting hole 22, and is completely liquefied by completing the melting in the vicinity of the outflow-side small opening 22b (see FIG. 4D). The pellet p is turned into the pellet pa in a completely liquefied state, and is sent to the nozzle 14 from the outflow-side small opening 22b and is injected into a molding die from the injection port 14a.

As described above, the pellet p that is pressed by the plunger 3 and enters from the inflow-side large opening 22a of the melting hole 22, is always in a surrounded state by the inner peripheral wall face of the melting hole 22 in a process advancing toward the outflow-side small opening 22b. Therefore, the melting of the pellet p is surely and speedily carried out by the heating unit 6, and an injection work into the molding die can be extremely efficiently performed.

Only a required quantity of the plurality of pellets p can be melted, and therefore the material is not exposed to a thermal and mechanical stress for a long time in the cylinder body section 11. Therefore, a resin molding with superior quality can be obtained. Further, owing to high melting efficiency of the injection device according to the present invention, there is no necessity for charging the material excessively. Thus, an overall device can be miniaturized, and saving of power and saving of resources can be realized. Moreover, a high temperature state of the resin can be shortened to a minimum time by setting the temperature of the melted resin in a proper state for injection and a highest state in a final melting process immediately before injection. Thus a resin molding with superior quality can be obtained.

Further, FIG. 9 is a view of a comparison between the present invention and a conventional technique, wherein according to the present invention, a thickness is larger toward the outflow-side where the melting hole 22 is not formed in the instrument body section 21 of the melting instrument 2 (see FIG. 9A), than the thickness of the conventional technique (Japanese Examined Patent Publication No. S36-9884) (see FIG. 9B). Therefore, according to the present invention, the heat capacity is larger toward the outflow-side small opening 22b of the melting instrument 2, than the heat capacity of a heating cylinder according to the conventional technique (Japanese Examined Patent Publication No. S36-

9884). Therefore, a melting state of the pellets p can be made stable and a temperature decrease of the melted pellets p can be suppressed.

With this structure, the time required for the high temperature state of the resin can be shortened to minimum by setting the temperature of the melted resin in a proper state for injection and a highest state in a final melting process immediately before injection when the melted resin reaches the outflow-side small opening. Thus, the resin molding with superior quality can be obtained. According to the conventional technique, the outflow-side thickness of the through-hole in the heating cylinder is small, thereby also making the heat capacity small, and therefore the temperature of the melted resin is not the proper temperature for injection and is not the highest temperature. Thus, the resin molding with superior quality is hardly obtained.

What is claimed is:

1. An injection device in a molding machine, comprising:
   a cylinder including a pellet supply port;
   a cylinder-shaped plunger disposed in the cylinder and reciprocating in an axial direction thereof;
   a driving unit reciprocally moving the plunger in the axial direction;
   a melting instrument with a plurality of melting holes, which are cone-shaped passages, formed in a cylinder-shaped instrument body to communicate from inflow-side large openings to outflow-side small openings;
   a nozzle provided on an injection side of the cylinder; and
   a heating unit heating the melting instrument, wherein
   the melting instrument is disposed between the plunger and the nozzle,
   a face, on which the plurality of inflow-side large openings of the melting instrument are formed, is set as an inflow side face opposed to a tip-end of the plunger, and
   a face opposed to the nozzle on an opposite side to the inflow side face is set as an outflow side face, and
   a diameter of the tip-end of the plunger is set to be the same as a diameter of the outflow side face of the melting machine.

2. The injection device in a molding machine according to claim 1, wherein the inflow side face and the outflow side face have the same diameter in the instrument body of the melting machine.

3. The injection device in a molding machine according to claim 1, wherein the outflow side face has a larger diameter than the inflow side face in the instrument body of the melting machine.

4. The injection device in a molding machine according to claim 1, wherein in the cylinder, an exhaust hole is formed between a movement range of a pressing tip-end portion of the plunger and the inflow side face of the melting instrument.

5. The injection device in a molding machine according to claim 1, wherein each of the melting holes of the melting instrument is cone-shaped.

6. The injection device in a molding machine according to claim 1, wherein each inflow-side large opening of the adjacent melting holes is formed into substantially a polygonal shape, and a portion as a boundary between adjacent inflow-side large openings is formed into substantially a linear blade shape, with the portion provided in a plurality being close to each other.

7. The injection device in the molding machine according to claim 1, wherein an air vent section constituted of a plurality of small holes is formed in an area in a peripheral direction near a supply port portion of the pellet supply port in the cylinder.

8. The injection device in a molding machine according to claim 2, wherein in the cylinder, an exhaust hole is formed between a movement range of a pressing tip-end portion of the plunger and the inflow side face of the melting instrument.

9. The injection device in a molding machine according to claim 2, wherein each of the melting holes of the melting instrument is cone-shaped.

10. The injection device in a molding machine according to claim 2, wherein each inflow-side large opening of the adjacent melting holes is formed into substantially a polygonal shape, and a portion as a boundary between adjacent inflow-side large openings is formed into substantially a linear blade shape, with the portion provided in a plurality being close to each other.

11. The injection device in the molding machine according to claim 2, wherein an air vent section constituted of a plurality of small holes is formed in an area in a peripheral direction near a supply port portion of the pellet supply port in the cylinder.

* * * * *